(12) United States Patent
Guo (10) Patent No.: US 7,736,931 B1
(45) Date of Patent: Jun. 15, 2010

(54) WAFER PROCESS FLOW FOR A HIGH PERFORMANCE MEMS ACCELEROMETER

(75) Inventor: Shuwen Guo, Burnsville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 12/506,022

(22) Filed: Jul. 20, 2009

(51) Int. Cl.
*H01L 21/00* (2006.01)
(52) U.S. Cl. .............................. 438/52; 438/50; 438/51; 257/E21.613
(58) Field of Classification Search .................... 438/50, 438/51, 52; 257/E21.613
See application file for complete search history.

(56) References Cited

U.S. PATENT DOCUMENTS

| | | | |
|---|---|---|---|
| 4,574,327 A | 3/1986 | Wilner | |
| 4,609,968 A | 9/1986 | Wilner | |
| 4,736,629 A | 4/1988 | Cole | |
| 4,825,335 A | 4/1989 | Wilner | |
| 4,999,735 A | 3/1991 | Wilner | |
| 5,205,171 A | 4/1993 | O'Brien et al. | |
| 5,220,835 A | 6/1993 | Stephan | |
| 5,367,429 A | 11/1994 | Tsuchitani et al. | |
| 5,404,749 A | 4/1995 | Spangler | |
| 5,454,266 A | 10/1995 | Chevroulet et al. | |
| 5,777,226 A | 7/1998 | Ip | |
| 5,900,550 A | 5/1999 | Menzel | |
| 6,230,567 B1 | 5/2001 | Greiff | |
| 6,531,332 B1 | 3/2003 | Shkel et al. | |
| 6,761,070 B2 * | 7/2004 | Zarabadi et al. | ........... 73/514.32 |
| 6,841,992 B2 | 1/2005 | Yue et al. | |
| 6,854,330 B2 | 2/2005 | Potter | |
| 6,871,544 B1 | 3/2005 | Selvakumar et al. | |
| 6,912,902 B2 | 7/2005 | Malametz et al. | |
| 6,935,175 B2 | 8/2005 | Eskridge et al. | |

(Continued)

FOREIGN PATENT DOCUMENTS

WO     WO-2006/134232 A1     12/2006

OTHER PUBLICATIONS

J. Chae, H. Kulah and K. Najafi, "An in-plane high sensitivity, low-noise micro-g silicon accelerometer," in *Proc. IEEE MEMS*, Jan. 2003, pp. 466-469.

(Continued)

*Primary Examiner*—Alexander G Ghyka
*Assistant Examiner*—Seahvosh J Nikmanesh
(74) *Attorney, Agent, or Firm*—Scott D. Wofsy; Edwards Angell Palmer & Dodge LLP (57) ABSTRACT

A process for fabricating a pendulous accelerometer, including the steps of: providing a first substrate having a top planar surface, etching a portion of the first substrate to a first predetermined depth from the top planar surface to form a plurality of first protrusions, providing a second substrate, etching a portion of the second substrate to a second predetermined depth to form a plurality of second protrusions, bonding planar surfaces of the first protrusions to planar surfaces of the second protrusions, and etching a portion of the first substrate from an opposite side of the first substrate to a third predetermined depth equal to or greater than the difference between the total thickness of the first substrate and the first predetermined depth to form a freely rotatable sensing plate that includes a substantially hollow proof mass.

20 Claims, 9 Drawing Sheets

U.S. PATENT DOCUMENTS

| | | | |
|---|---|---|---|
| 6,945,110 | B2 | 9/2005 | Selvakumar et al. |
| 7,022,543 | B2 | 4/2006 | Eskridge et al. |
| 7,140,250 | B2 | 11/2006 | Leonardson et al. |
| 7,426,863 | B2 * | 9/2008 | Kuisma .................... 73/514.32 |
| 2004/0055382 | A1 | 3/2004 | Samuels et al. |
| 2004/0221650 | A1 | 11/2004 | Lehtonen |
| 2005/0005698 | A1 | 1/2005 | McNeil et al. |
| 2005/0109109 | A1 | 5/2005 | Eskridge et al. |
| 2005/0268719 | A1 | 12/2005 | Malametz |
| 2006/0169043 | A1 | 8/2006 | McNeil |
| 2006/0185433 | A1 | 8/2006 | Leonardson et al. |
| 2006/0277997 | A1 | 12/2006 | Foster et al. |
| 2007/0034007 | A1 | 2/2007 | Acar |
| 2009/0107238 | A1 * | 4/2009 | Guo ........................ 73/514.32 |
| 2010/0005884 | A1 * | 1/2010 | Weinberg et al. ......... 73/504.15 |

OTHER PUBLICATIONS

N. Yazdi and K. Najafi, "An All-Silicon Single-Wafer Micro-G Accelerometer with a Combined Surface and Bulk Micromachining Process," J. Microelectromech. Sys., vol. 9, No. 4, pp. 544-550, Dec. 2000.

L. Ristic, R. Gutteridge, J. Kung, D. Koury, B. Dunn, and H. Zunino, "A Capacitive Type Accelerometer with Self-Test Feature Based on a Double-Pinned Polysilicon Structure," in Tech. Dig. 7th Int. Conf. Solid-State Sensors and Actuators (Transducers '93), Yokohama, Japan, Jun. 1993, pp. 810-812.

F. Rudolf, A. Jornod, and P. Bencze, "Silicon microaccelerometer," in Tech Dig. 4th Int. Conf. Solid-State Sensors and Actuators (Transducers '87), Tokyo, Japan, Jun. 1987, pp. 395-398.

F. Rudolf, A. Jornod, J. Bergqvist, and H. Leuthold, "Precision Accelerometers with μg. Resolution," Sensors and Actuators, vol. A21-A23, pp. 297-302, 1990.

W. Henrion, L. DiSanza, M. Ip, S. Terry, and H. Jerman, "Wide-dynamic range direct digital accelerometer," in Tech Dig. Solid-State Sensors and Actuators Workshop, Hilton Head Island, SC, Jun. 1990, pp. 153-157.

Y. deCoulon, T. Smith, J. Hermann, M. Chevroulet, and F. Rudolf, "Design and test of a precision servoaccelerometer with digital output," in Tech. Dig, 7th Int. Conf. Solid-State Sensors and Actuators (Transducers '93), Yokohama, Japan, Jun. 1993, pp. 832-835.

K. Warren, "Navigation Grade Silicon Accelerometers with Sacrificially Etched Simox and Besot Structure," in Tech. Dig, Solid-State Sensors and Actuators Workshop, Hilton Head Island SC, Jun. 1994, pp. 69-72.

T.V. Roszhart, H. Jerman, J. Drake, and C. deCotiis, "An Inertial-Grade Micromachined Vibrating Beam Accelerometer," in Tech. Dig. 8th Int. Conf. Solid-State Sensors and Actuators (Transducers '95), Stockholm, Sweden, Jun. 1995, pp. 4-19 — 4-22.

C. Liu, A.M. Barzilai, J.K. Reynolds, A. Partridge, T.W. Kenny, J.D. Grade, and H.K. Rockstad, "Characterization of a High-Sensitivity Micromachined Tunneling Accelerometer with Micro-g Resolution" J. Microelectromech. Sys., vol. 7, No. 2, Jun. 1998, pp. 235-244.

S.J. Sherman, W.K. Tsang, T.A. Core, R.S. Payne, D.E. Quinn, K.H. Chau, J.A. Farash, and S.K. Baum, "A Low-Cost Monolithic Accelerometer; Product/Technology Update," in Tech. Dig. IEEE Electron Devices Meeting (IEDM '92), Dec. 1992, pp. 501-504.

L. Ristic, R. Gutteridge, B. Dunn, D. Mietus, and P. Bennett, "Surface Micromachined Polysilicon Accelerometer," in 5th Tech. Dig. Solid-State Sensor and Actuator Workshop, Hilton Head Island, SC, Jun. 1992, pp. 118-121.

Official Communication and Partial European Search Report issued Feb. 9, 2009.

European Search Report dated May 8, 2009.

* cited by examiner

WAFER PROCESS FLOW FOR A HIGH PERFORMANCE MEMS ACCELEROMETER

BACKGROUND OF THE INVENTION

1. Field of the Invention

The present invention relates to fabrication processes for accelerometers and other force sensing devices, and more particularly to a fabrication process for producing a capacitive pendulous MEMS accelerometer with a symmetric plate area having an asymmetric plate mass.

2. Description of Related Art

High performance accelerometers with near micro-gravity resolution, high sensitivity, high linearity, and low bias drift are needed for a wide variety of applications, especially aerospace applications such as inertial navigation systems, guidance systems, and air data measurement systems. The resolution of high-performance accelerometers has been limited by thermomechanical Brownian noise of the sensor, which is dictated by the damping coefficient and the mass of the structure, as well as by the readout electronics.

Fabrication technology plays a critical role in ensuring that large mass, large capacitance, and small damping are simultaneously obtained, and that micro-gravity resolution is achieved. Previously, a number of high performance silicon accelerometers have been reported. These devices utilize a large proof mass in conjunction with capacitive, resonant, or tunneling current sensing schemes to achieve high sensitivity. Among all these, silicon capacitive accelerometers have several advantages that make them very attractive for numerous applications ranging from low cost, large volume automotive accelerometers to high precision inertial grade micro-gravity devices. Silicon capacitive accelerometers have high sensitivity, good direct current response and noise performance, low drift, low temperature sensitivity, low power dissipation, and a simple structure.

Capacitive accelerometers are typically vertical and lateral structures. Some designs use a see-saw structure, with a proof mass such as a flat plate suspended by torsional beams. The structure is typically asymmetrically shaped so that one side has greater mass than the other, resulting in a center of mass that is offset from the axis of the torsion bars. When an acceleration force produces a moment about the torsion bar axis, the plate is free to rotate, constrained only by the spring constant of the torsion bars.

The sensitivity of these types of accelerometers is defined as the ratio of deflection to acceleration. The mass of the plate, the distance from the center of mass to the torsion bar axis, and the torsion bar stiffness determine sensitivity. To increase the offset of the center of mass, the plate structure is designed to have an asymmetric shape. For example, one side of the plate may have a width that is larger than the other side of the plate, or one side of the plate may have a greater length than the other side. However, increasing the center mass offset by the asymmetric shaping methods mentioned above may result in an increase in total mass of the plate, which leads to reduced resonant frequency and decreased sensitivity. Increasing the center mass offset by asymmetric shaping may also result in a sacrifice of some of the dynamic g-range, which is defined by the separation distance between a stationary sensing element and the pendulous acceleration sensing plate. Another method for increasing center mass offset involves lengthening a portion of the pendulous sensing plate. The center mass offset is proportional to the length of the extended portion of the plate. However, extending one side of the plate may lead to unbalanced gas damping, which results in performance degradation. Gas damping can be balanced by perforating portions of the extended plate. However, such perforations also reduce the center mass offset and so reduces the sensitivity. Additionally, extending one side of the plate may result in an increase of the overall chip size.

Other conventional structures have utilized a deeper gap underneath the extended plate portion to increase the maximum angle of rotation while maintaining balanced gas damping. Such a structure may increase the dynamic g-range to some extent. However, the extended portion of the plate increases the dimension of the overall chip size, leads to unbalanced gas damping, and reduces the resonant frequency of the rotational structure, which again results in a decrease in the performance of the accelerometer.

An asymmetric pendulous MEMS accelerometer was disclosed in U.S. patent application Ser. No. 11/978,090, filed in the U.S. Patent and Trademark Office on Oct. 26, 2007, the disclosure of which is herein incorporated by reference. A pendulous accelerometer having a hollow plate structure exhibits higher sensitivity than that of a pendulous accelerometer having a solid plate structure of the same dimensions and the same capacitance. However, fabricating a pendulous accelerometer with such a hollow plate structure can present challenges.

Accordingly, there is a need for an economical and efficient process for fabricating a capacitive pendulous MEMS accelerometer with a symmetric plate area having an asymmetric plate mass that includes a hollow plate structure.

SUMMARY OF THE INVENTION

The subject invention is directed to a process for fabricating a pendulous accelerometer having a sensing plate with a symmetric plate area and an asymmetric plate mass. Steps of the process will become more readily apparent to those having ordinary skill in the art from the following detailed description of the invention taken in conjunction with the several drawings described below.

A process for fabricating a pendulous accelerometer having a sensing plate with a symmetric plate area and an asymmetric plate mass is provided. The process includes the following steps: providing a first substrate having a top planar surface, a bottom planar surface substantially parallel to the top planar surface, and a total thickness extending from the top planar surface to the bottom planar surface; etching a portion of the first substrate to a first predetermined depth from the top planar surface to form a plurality of first protrusions each having a top planar surface; providing a second substrate having an upper planar surface; etching a portion of the second substrate to a second predetermined depth extending from the upper planar surface to form a plurality of second protrusions each having an upper planar surface; bonding the top planar surface of at least one of the first protrusions to the upper planar surface of at least one of the second protrusions to form an anchor portion; and etching a portion of the first substrate from the bottom planar surface to a third predetermined depth at least equal to the difference between the total thickness of the first substrate and the first predetermined depth to form a freely rotatable sensing plate having a solid proof mass on a first side of the anchor portion and a substantially hollow proof mass on a second side of the anchor portion.

The process may further include the steps of: forming a first fixed electrode surface on the second substrate beneath the first side of the sensing plate; forming a second fixed electrode surface on the second substrate beneath the second side of the sensing plate; and forming a plurality of protrusions extending upward from each of the fixed electrode surfaces.

The step of forming the plurality of protrusions may include performing a thermal oxidation process on selected areas of the second substrate to form a plurality of oxide bumps.

The step of etching a portion of the first substrate from the top planar surface may include the steps of depositing a first masking material on a portion of the top planar surface of the first substrate and photo chemical etching a remaining portion of the first substrate that is not covered by the masking material. Both the first and second substrates may be silicon-on-insulator substrates having two silicon layers separated by an oxide layer.

The step of etching a portion of the second substrate may include the following steps: depositing a first masking layer using plasma enhanced chemical vapor deposition (PECVD) or low pressure chemical vapor deposition (LPCVD) on a portion of the upper planar surface of the second substrate; reactive ion etching a portion of the second substrate not covered by the first masking layer to form the plurality of second protrusions; removing the first masking layer; depositing a second masking layer on a portion of the second substrate, including each of the plurality of second protrusions; deep reactive ion etching the portion of the second substrate not covered by the second masking layer to form a fixed electrode structure extending upward from the oxide layer, wherein the fixed electrode structure has a thickness, as measured from the oxide layer, that is less than the thickness of each of the second protrusions; and removing the second masking layer.

The process may further include the steps of: providing a topping wafer; etching a portion of the topping wafer to form a topping recess; and bonding the topping wafer to the second substrate such that the freely rotatable sensing plate is enclosed within the topping recess.

A process for fabricating a pendulous accelerometer having an asymmetrical sensing plate is also provided. The process includes the following steps: depositing a first masking material on a portion of a top planar surface of a first substrate, the first substrate having a bottom planar surface substantially parallel to the top planar surface and a total thickness measured from the top planar surface to the bottom planar surface; etching a remaining portion of the first substrate that is not covered by the masking material to a first predetermined depth measured from the top planar surface to form a plurality of first protrusions having planar surfaces; depositing a second masking material on a portion of a first planar surface of a second substrate; etching a remaining portion of the second substrate that is not covered by the masking material to a second predetermined depth measured from the first planar surface to form a plurality of second protrusions each having a planar surface; bonding the planar surface of at least one of the first protrusions to the planar surface of at least one of the second protrusions to form an anchor portion; etching the first substrate from the bottom planar surface to a third predetermined depth equal to or larger than the difference between the total thickness of the first substrate and the first predetermined depth to form a freely rotatable sensing plate having a solid proof mass on a first side of the anchor portion and a substantially hollow proof mass on the second side of the anchor portion. The step of etching the first substrate from the bottom planar surface may further include etching a plurality of hollow cavities in the first substrate to form the substantially hollow proof mass on the second side of the anchor portion.

BRIEF DESCRIPTION OF THE DRAWINGS

So that those skilled in the art to which the subject invention pertains will readily understand how to implement the fabrication process for an asymmetric silicon proof mass accelerometer without undue experimentation, preferred embodiments of the fabrication process will be described in detail below with reference to the following figures.

DETAILED DESCRIPTION OF THE PREFERRED EMBODIMENTS

An exemplary fabrication process flow according to the present invention will now be described. A silicon on insulator (SOI) bottom electrode wafer with a thickness of about 5 µm is obtained. A shallow cavity is photo patterned and wet etched to a depth of 1.6 µm in the bottom electrode wafer, followed by a deep reactive ion etch (DRIE) to form bottom electrodes. A top electrode SOI wafer with a thickness of about 75 µm is etched by potassium hydroxide (KOH) to form a proof cavity with a channel depth of about 20 µm. The bottom electrode wafer and top electrode wafer are then fusion bonded to one another. A handle wafer of the top electrode wafer is then removed, leaving a 75 µm active layer. Finally, the active layer of the top electrode wafer can be photo patterned and released by DRIE etch to release a rotatable sensing plate and to form a hollow proof mass on one side of the sensing plate. The hollow proof mass, having a cavity between 50 an 55 µm deep, will be formed during the DRIE etch step. Because the proof mass has been etched 20 µm from an opposite side of the active layer, the top electrode etch depth is only about 55 µm. Thus, an asymmetric proof mass can be formed during the top electrode release etch without adding an additional etch step. The released device wafer is then metallized by sputtering through a shadow mask followed by a sintering. The wafer is then bonded and sealed to a topping wafer by glass frit in a partial pressure around 50-100 mTorr.

Figure 1:
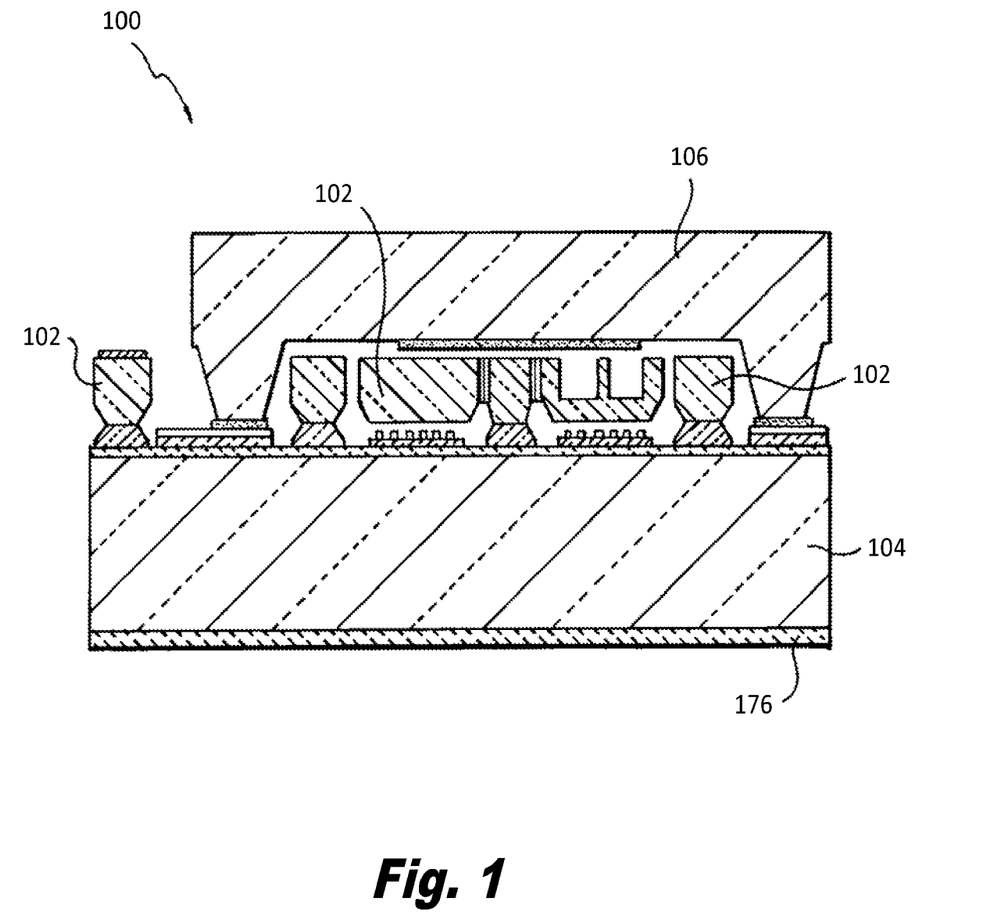
FIG. 1 illustrates a cross-sectional view of an accelerometer structure produced by the fabrication process of the present invention.

For purposes of explanation and illustration, and not limitation, a cross-sectional view of a pendulous accelerometer 100 having a sensing plate with a symmetric plate area and an asymmetric plate mass, as fabricated by an exemplary embodiment of the process of the present invention, is shown in FIG. 1. Accelerometer 100 may include a first substrate 102, a second substrate 104, and a topping wafer 106.

Figure 2:
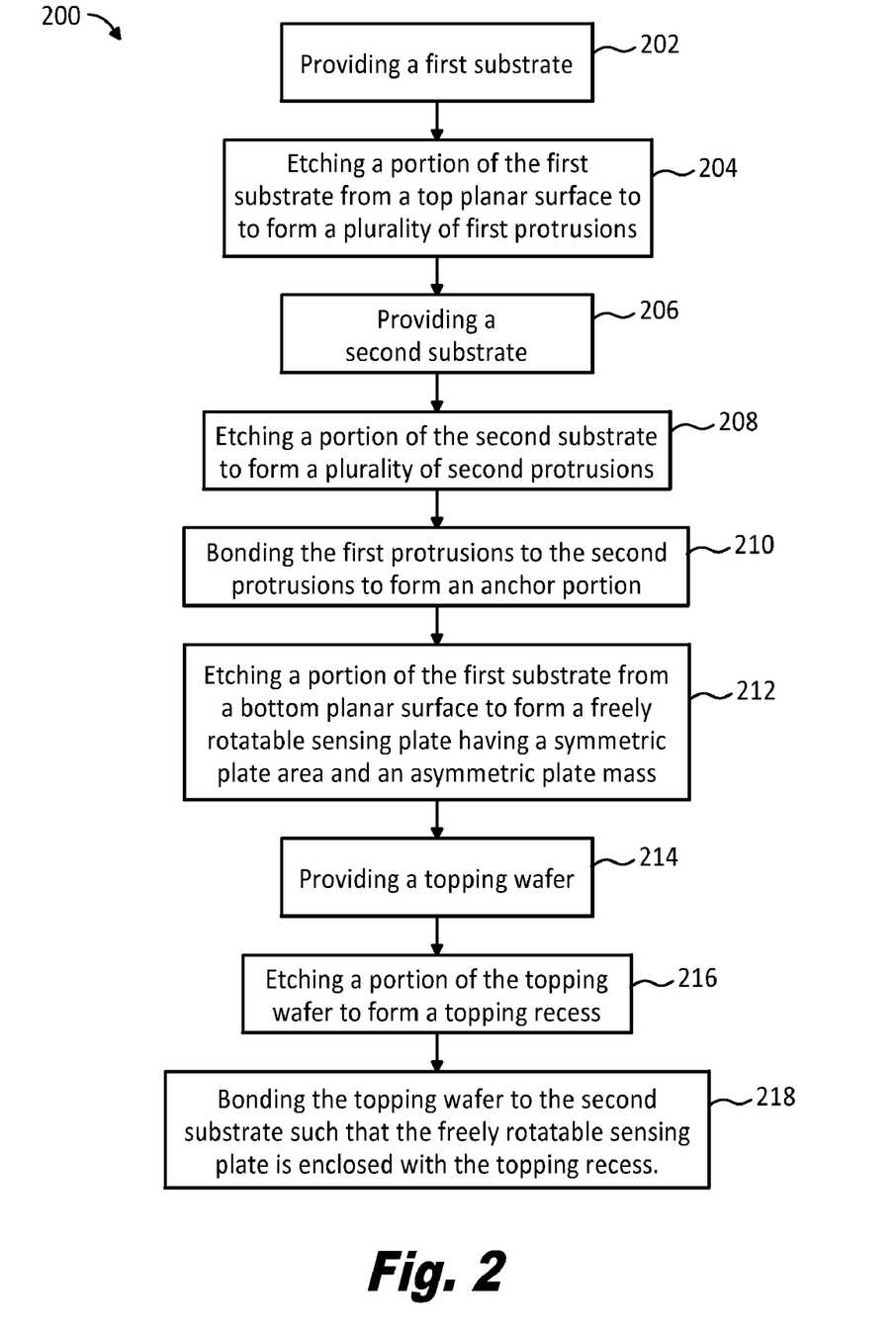
FIG. 2 is a flow chart illustrating an exemplary embodiment of a fabrication process according to the present invention.

FIG. 2 illustrates an exemplary process 200 for fabricating the accelerometer 100 according to the present invention. Step 202 of process 200 includes providing first substrate 102. Step 204 includes etching a portion of first substrate 102 from a top planar surface of first substrate 102 to form a plurality of first protrusions on the substrate. Step 206 includes providing second substrate 104. Step 208 includes etching a portion of second substrate 104 to form a plurality of second protrusions on second substrate 104. Step 210 includes bonding the flat surfaces of the first protrusions of first substrate 102 to the flat surfaces of the second protrusions of second substrate 104, and includes forming an anchor portion for pendulous accelerometer 100. Step 212 includes etching a portion of first substrate 102 from a bottom planar surface of the substrate to form a freely rotatable sensing plate having a symmetric plate area and an asymmetric plate mass. Step 214 of process 200 includes providing a topping wafer. Step 216 includes etching a portion of the topping wafer to form a topping recess. Finally, step 218 includes bonding the topping wafer to the second substrate such that the freely rotatable sensing plate is enclosed within the topping recess.

Figure 3:
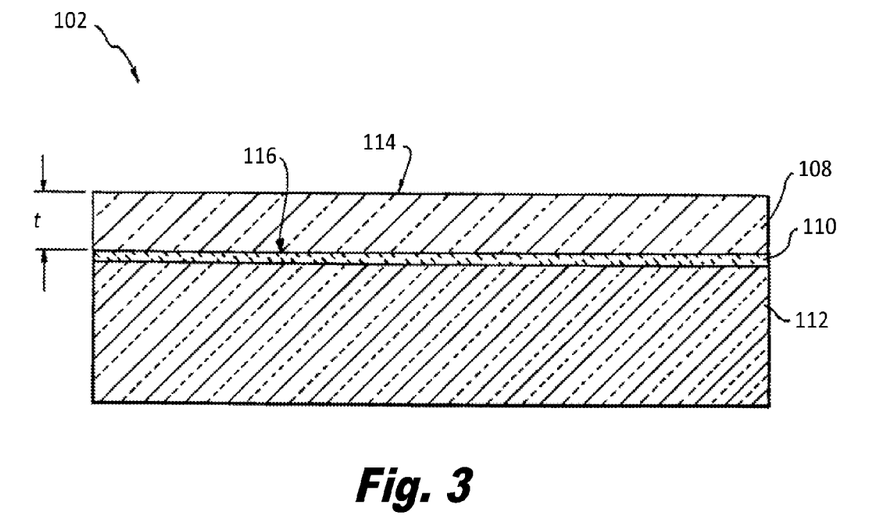
FIG. 3 illustrates a first silicon on insulator (SOI) substrate used in the process described in FIG. 2.

FIGS. 3 through 15 illustrate one or more components of accelerometer 100 during the various steps of process 200. FIG. 3 shows first substrate 102 prior to etching step 204 of process 200. In one exemplary embodiment, as shown in FIG. 3, first substrate 102 comprises a silicon on insulator (SOI) material. First substrate 102 may include a top silicon layer 108 bonded to an oxide layer 110, which is in turn bonded to a bottom silicon layer 112. In one exemplary embodiment, oxide layer 110 is made of silicon dioxide. Bottom silicon layer 112 may act as a handle wafer during fabrication process 200. Top silicon layer 108 includes a top planar surface 114 and a bottom planar surface 116 that is substantially parallel to top planar surface 114. Top silicon layer 108 has a thickness t extending from top planar surface 114 to bottom planar surface 116.

Figure 4:
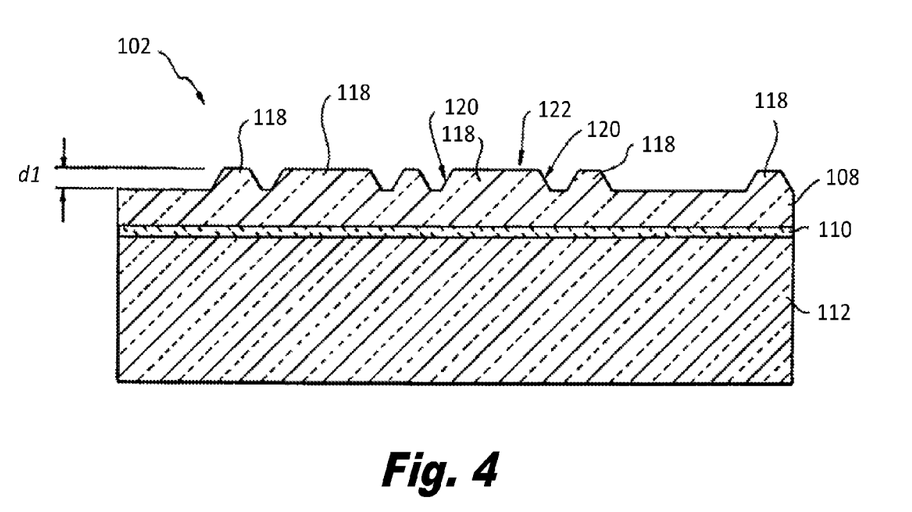
FIG. 4 illustrates first SOI substrate after completion of etching step 204 described in FIG. 2.

During etching step 204, a portion of top silicon layer 114 is etched to a first predetermined depth d1 from top planar surface 114 to form a plurality of first protrusions 118, as shown in FIG. 4. Etching step 204 may be accomplished by any suitable etching process. In one exemplary embodiment, a layer of silicon nitride is deposited as a masking layer on top planar surface 114 using a chemical vapor deposition process, for example, low pressure chemical vapor deposition (LPCVD). The nitride layer is deposited on a portion of top planar surface 114 and serves as a masking material during a photo chemical etching process, for example, a potassium hydroxide (KOH) etch. The deposited silicon nitride layer may have a thickness of approximately 1500 angstrom.

As shown in FIG. 4, each one of the plurality of first protrusions 118 may have a trapezoidal cross-section having sloped side walls 120 and a top planar surface 122. The trapezoidal cross-sections of first protrusions 118 are produced by applying an anisotropic wet etchant such as potassium hydroxide (KOH) to top silicon layer 108, which etches the silicon at different rates along different crystallographic planes. During application of the etchant, the portions of top silicon layer 108 that are covered by the nitride layer remain intact, while those portions of top silicon layer 108 that are not covered by the nitride layer are removed to the predetermined depth d1.

In one exemplary embodiment, the thickness t of top silicon layer 108 of the first SOI substrate 102 is approximately 75 µm, and top silicon layer 108 is etched to a depth of approximately 20 µm from top planar surface 114 of top silicon layer 108.

Figure 5:
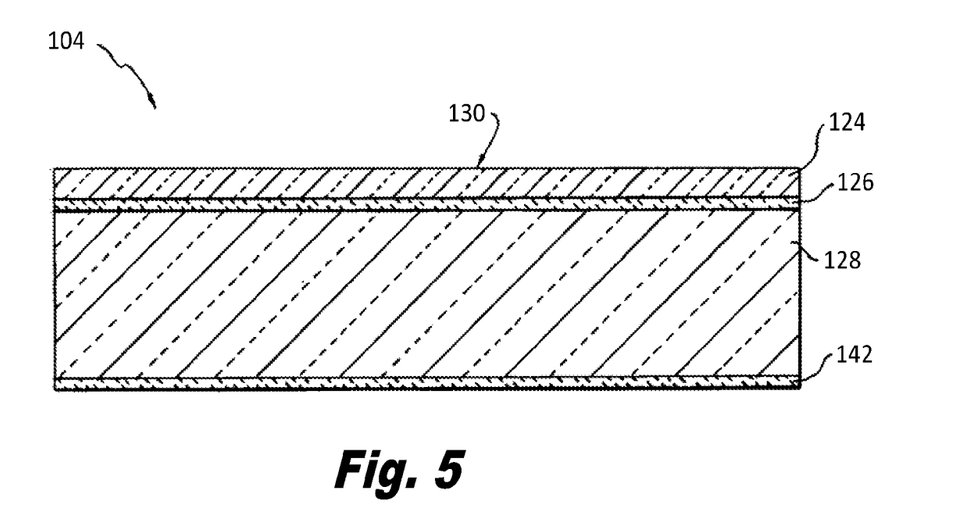
FIG. 5 illustrates a second SOI substrate used in the process described in FIG. 2.

FIG. 5 illustrates second substrate 104 prior to etching step 208 of process 200. As shown in FIG. 5, second substrate 104 may be a silicon on insulator (SOI) substrate that includes an upper silicon layer 124, a buried oxide layer 126, and a lower silicon layer 128. Second substrate 104 may also include a handle oxide layer 142 formed on a lower surface of lower silicon layer 128. Upper silicon layer 124 of second substrate 104 includes an upper planar surface 130 and may have a thickness that is significantly less than the thickness t of top silicon layer 108 of first substrate 102. In one exemplary embodiment, upper silicon layer 124 of second substrate 104 has a thickness of approximately 5 µm, while top silicon layer 108 of first substrate 102 has a thickness of approximately 75 µm.

Etching step 208 of process 200 can be performed using any suitable etching process. During etching step 208, a portion of second substrate 104 is etched to a predetermined depth from upper planar surface 130 to form a plurality of second protrusions 132. In one exemplary embodiment, etching step 208 may include two stages.

Figure 6:
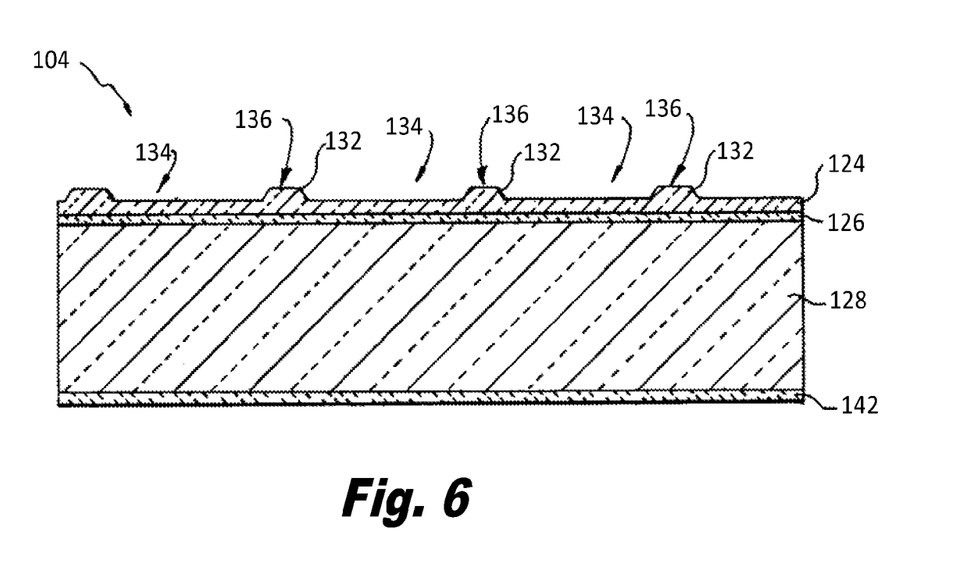
FIG. 6 illustrates second SOI substrate after a first wet etching stage of etching step 208 described in FIG. 2.

FIG. 6 illustrate second substrate 104 after a first stage of etching step 208. The first stage of etching step 208 may include the application of a nitride masking layer to select areas of upper planar surface 130 using low pressure chemical vapor deposition (LPCVD). The portions of upper silicon layer 124 that are not covered by the nitride layer will be etched to a predetermined depth. The first stage of etching process 208 may be accomplished using a KOH etch to form a plurality of shallow cavities 134 having trapezoidal cross sections and a plurality of second protrusions 132 each having trapezoidal cross sections and a planar upper surface 136 that is substantially parallel to an upper surface of buried oxide layer 126. The first stage of etching process 208 may also be performed by reactive ion etching (RIE) upper silicon layer 124. In the exemplary embodiment where upper planar surface 130 of upper silicon layer 124 has a thickness of approximately 5 µm, each of the shallow cavities 134 may have a depth of approximately 1.6 µm.

Figure 7:
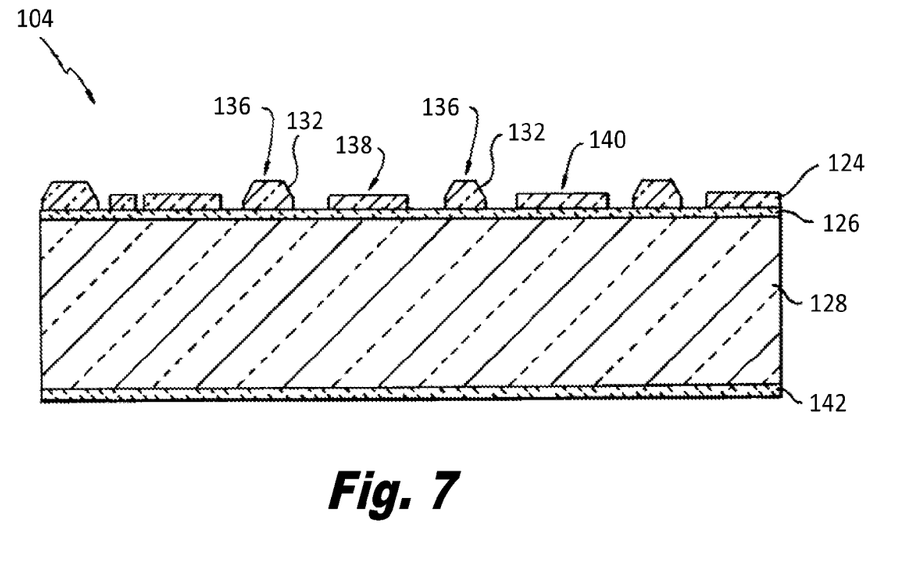
FIG. 7 illustrates second SOI substrate after a second deep reactive ion etching (DRIE) stage of etching step 208 described in FIG. 2.

FIG. 7 illustrates second substrate 104 after a second stage of etching step 208. The second stage of etching step 208 includes etching select portions of upper silicon layer 124 to expose buried oxide layer 126. The second stage of etching step 208 may include applying a nitride masking layer and selectively removing portions of upper silicon layer 124 using deep reactive ion etching (DRIE). DRIE is particularly well-suited for the second stage of etching step 208 because the process can achieve etch depths of hundreds of microns with nearly vertical sidewalls. As shown in FIG. 7, portions of upper silicon layer 124 defined by shallow cavities 132 are etched down to buried oxide layer 126 of second substrate 104 to form a plurality of protrusions having a rectangular cross-section extending upward from buried oxide layer 126. The rectangular protrusions include protrusions having a first fixed electrode surface 138 and a second fixed electrode surface 140 that will be positioned beneath a first side and second side, respectively, of the sensing plate of accelerometer 100.

Figure 8:
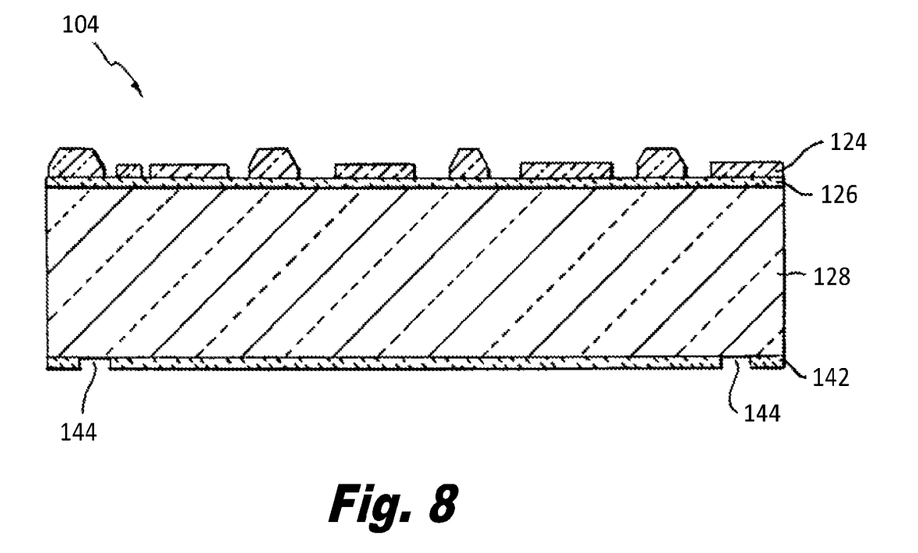
FIG. 8 illustrates an oxide handle layer of second SOI substrate, the oxide handle layer having alignment marks to aid in the bonding process described in step 210 of FIG. 2.

FIG. 8 illustrates handle oxide layer 142 that may be applied to a bottom surface of lower silicon layer 128 of second substrate 104. Alignment marks 144 may be formed in handle oxide layer 142 by reactive ion etching or by another suitable process. Alignment marks 144 are useful in ensuring that first substrate 102 and second substrate 104 are properly aligned during bonding step 212 of process 200.

Figure 9:
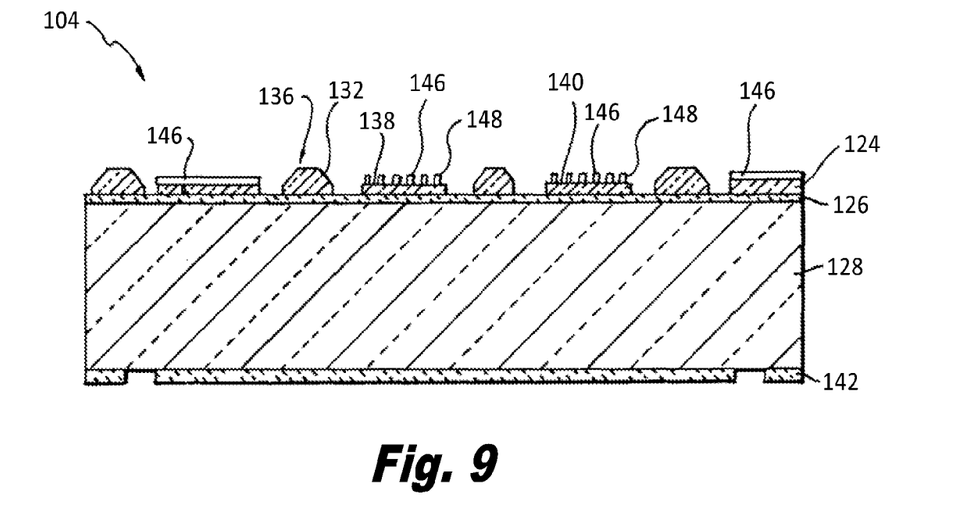
FIG. 9 illustrates second SOI substrate after a thermal oxidation step that forms a plurality of oxide bumps on electrode surfaces of second SOI substrate.

FIG. 9 illustrates an additional step that may be performed after etching step 208 and prior to bonding step 212 of process 200. As shown in FIG. 9, an anti-stiction coating 146 may be applied to the plurality of rectangular protrusions extending upward from buried oxide layer 126 of second substrate 104, including first fixed electrode surface 138 and second fixed electrode surface 140.

In one exemplary embodiment, anti-stiction coating 146 includes a plurality of bumps 148 formed on first fixed electrode surface 138 and second fixed electrode surface 140. Bumps 148 may be oxide bumps produced by a thermal oxidation process that creates a thin layer of oxide, such as silicon oxide on the surface of the second substrate 104. The thermal oxidation process can be performed on selected areas of second substrate 104 and blocked on other areas of the substrate. The areas of substrate 104 which are not to be oxidized are covered with a nitride film, for example, a silicon nitride film. The nitride film blocks diffusion of oxygen and water vapor. During oxidation, the silicon substrate 104 reacts with the ambient oxygen, forming a layer of silicon dioxide on the surface of the substrate.

In one exemplary embodiment, a nitride film having a thickness of 1500 angstrom is selectively applied to fixed electrode surfaces 138, 140 by low pressure chemical vapor deposition (LPCVD). The nitride film is then selectively etched using any suitable process, for example, reactive ion etching (RIE). A thermal oxidation process is then performed to a depth of 2000 angstrom to form a pattern of oxide bumps 148 on electrode surfaces 138, 140 and as well as an oxide layer other portions of second substrate 104. The nitride layer may then be stripped away using hot phosphorus or any other suitable method.

The oxide bumps 148 serve as a protection layer for first and second electrode surfaces 138, 140 during the final etching step 212 of process 200, and also serve as an overload protection layer (anti-stiction) during high-shock conditions within accelerometer 100. In other words, oxide bumps 148 prevent the rotating sensing plate of accelerometer 100 from impacting and sticking to electrodes 138, 140 and any other part of second substrate 104.

Figure 10:
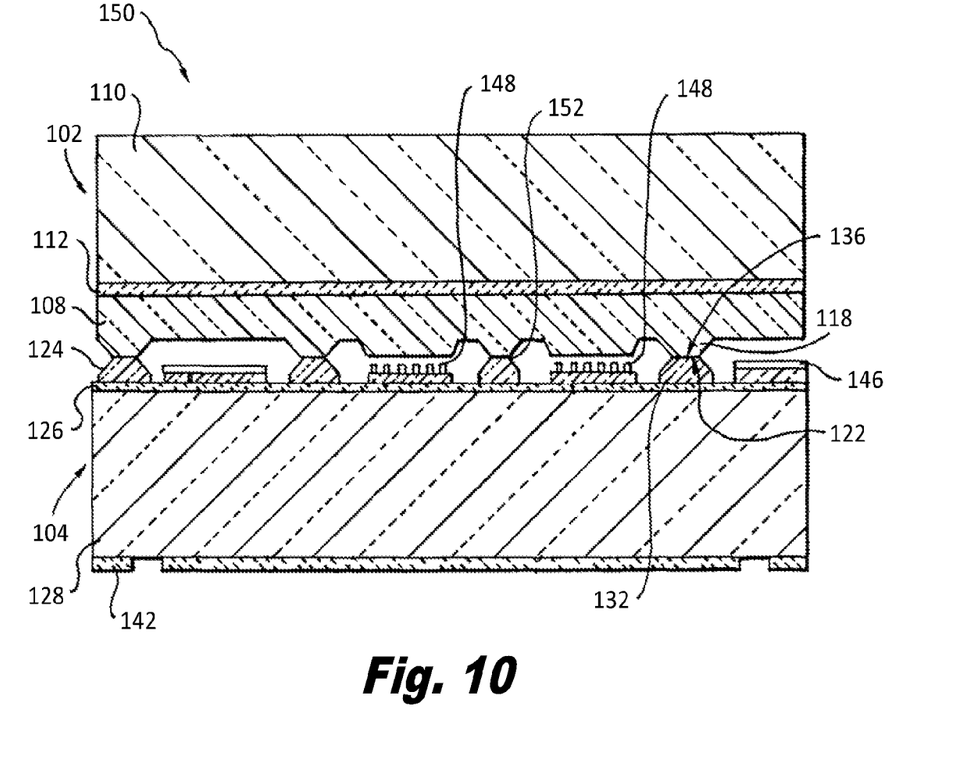
FIG. 10 illustrates a wafer stack that results from alignment fusion bonding first SOI substrate to second SOI substrate, as described in step 210 of FIG. 2.

FIG. 10 illustrates a wafer stack 150, that is, the structure that results from the bonding of first substrate 102 or top electrode wafer, to second substrate 104 or bottom electrode wafer. FIG. 10 illustrates first substrate 102 and second substrate 104 after bonding step 210 of process 200 has been performed. During boding step 210, a plurality of the top planar surfaces 122 of trapezoidal first protrusions 118, formed within top silicon layer 108 of first substrate 102, are each bonded to an upper planar surface 136 of the second protrusions 132 formed in upper silicon layer 124 of second substrate 104. One of the first protrusions 118 and one of the second protrusions 132 are bonded together to form an anchor portion 152 of the sensing plate of accelerometer 100.

In one exemplary embodiment, first substrate 102 and second substrate 104 are bonded together via a fusion bonding process. During the fusion bonding process, the flat silicon surfaces 122, 136 of first and second protrusions 118, 132, respectively, are brought into direct contact and a high contact force is applied. Once in contact, the flat surfaces of substrate 102 and substrate 104 are held together by van der Waals or other atomic forces. The substrates may then be subject to thermal annealing to strengthen the bond between the two substrates.

Figure 11:
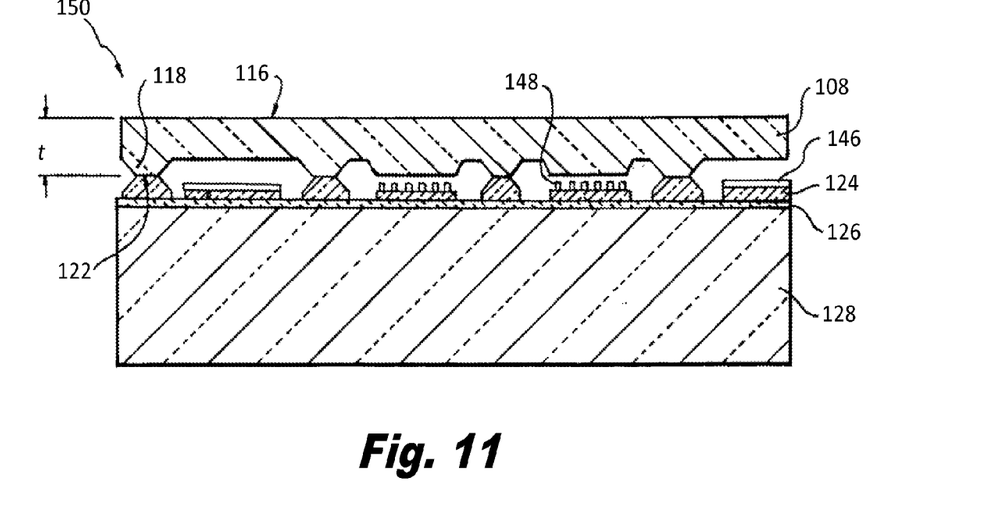
FIG. 11 illustrates the wafer stack of FIG. 10 after removal of a handle portion of first SOI substrate.

As shown in FIG. 11, after bonding step 210 has been performed, and prior to etching step 212, oxide layer 110 and bottom silicon layer 112 of first substrate 102 may be removed from wafer stack 150 by any suitable process to expose bottom planar surface 116 of top silicon layer 108. As shown in FIG. 11, top silicon layer 108 has a total thickness t that extends between bottom planar surface 116 and the plurality of top planar surfaces 122 of first protrusions 118.

Figure 12:
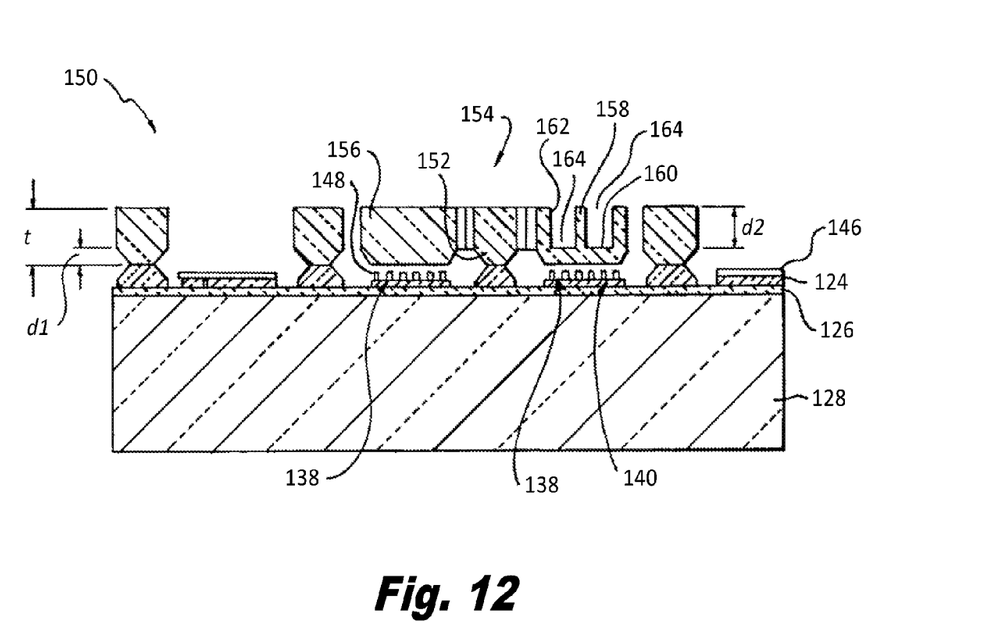
FIG. 12 illustrates the wafer stack of FIG. 11 after etching step 212 described in FIG. 2.

FIG. 12 illustrates the resulting wafer stack 150 after etching step 212 of process 200. During etching step 212, a portion of top silicon layer 108 is etched from bottom planar surface 116 to a second predetermined depth d2. Second predetermined depth d2 is equal to or greater than the difference between the total thickness t of top silicon layer 108 and the first predetermined depth d1. As a result, etching step 212 forms a sensing plate 154 having a solid proof mass 156 positioned above the first electrode surface 138 and a substantially hollow proof mass 158 positioned above the second electrode surface 140. Solid proof mass 156 and substantially hollow proof mass 158 are connected by anchor portion 152 such that sensing plate 154 can freely rotate about anchor portion 152.

In one exemplary embodiment, each half of sensing plate 154 is substantially the same size. That is, solid proof mass 156 and hollow proof mass 158 each have approximately the same length and width. The hollow proof mass 158 may include a substantially planar floor portion 160, with sidewalls 162 extending upward from the floor portion 160 to form one or more cavities 164. Sidewalls 162 may include at least two walls that intersect at substantially right angles to form a plurality of rectangular cavities 164. In one exemplary embodiment, hollow proof mass 158 includes four rectangular cavities 164 separated by sidewalls 162 that are substantially perpendicular to floor portion 160. Other shapes and sizes of cavities 164 are also within the scope of the invention. Advantageously, etching step 212 releases sensing plate 154 and forms cavities 164 within sensing plate 154 using a single process step.

Hollow proof mass 158 allows for a center of mass offset while maintaining equal surface areas on a bottom surface of each side of sensing plate 154, which allows for balanced gas damping. The center of mass offset can be adjusted by adjusting the thickness of sensing plate 154 and/or adjusting the depth of cavities 164. In one exemplary embodiment, the total thickness t of sensing plate 154 is approximately 75 μm, first predetermined distance d1 is approximately 20 μm, and second predetermined distance is approximately 55 μm.

Because the resonant frequency of sensing plate 154 having hollow proof mass 158 is higher than that of a conventional proof mass for an accelerometer, sensing plate 154 exhibits a higher resonant frequency than a conventional plate having the same dimensions, capacitance, and spring constant as sensing plate 154.

Figure 13:
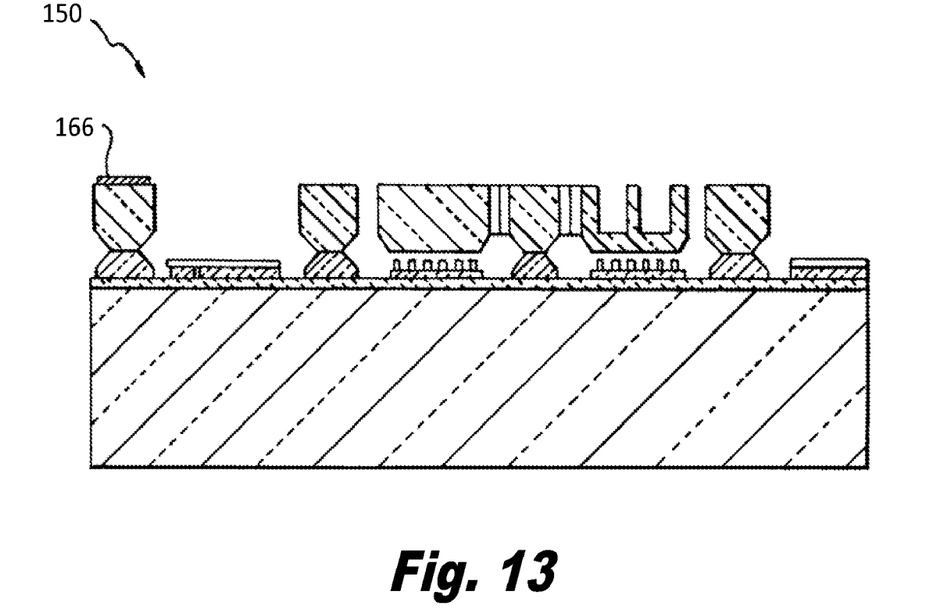
FIG. 13 a wafer probe formed on the wafer stack to be used for forming electrical connections to the wafer stack.

FIG. 13 illustrates wafer stack 150 after an additional metallization step which provides electrical contacts to wafer stack 150. In one exemplary embodiment, the metallization step is carried out by a sputtering process through a shadow mask followed by a sintering process, resulting in a wafer probe 166. Wafer probe 166 allows for electrical connections to wafer stack 150.

Figure 14:
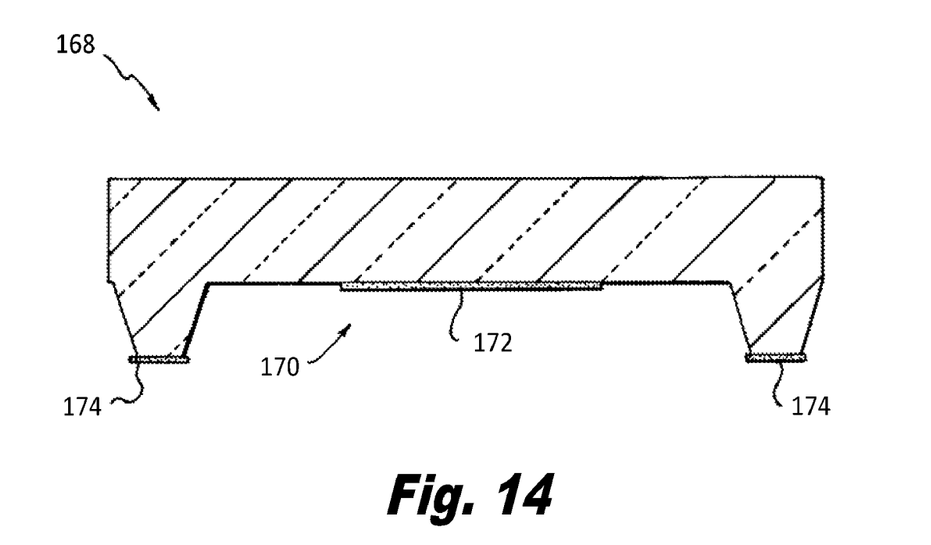
FIG. 14 illustrates a topping wafer having a topping recess used to enclose a sensing plate of the accelerometer formed by the process described in FIG. 2.

FIG. 14 illustrates a topping wafer 168 after etching step 216 of process 200. In one exemplary embodiment, topping wafer 168 is made of silicon and is etched to a predetermined depth to form a topping recess 170. Etching step 216 can be performed by any suitable etching process. A getter sputter deposition layer 172 may be applied a portion of the surface of topping wafer 168 within topping recess 170, and a frit bond 174 may be applied to the surfaces of the topping wafer that are to be bonded to wafer stack 150.

Figure 15:
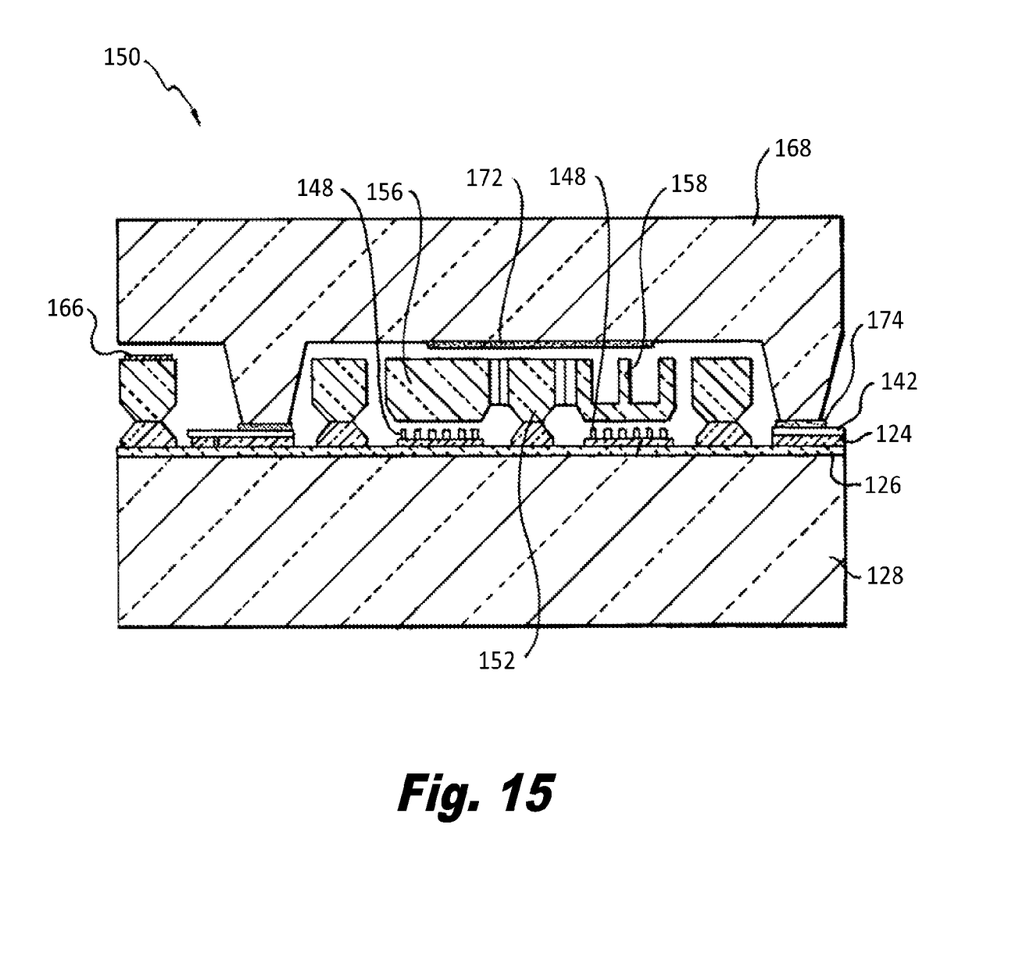
FIG. 15 illustrates the wafer stack after the topping wafer of FIG. 14 has been bonded to the wafer stack to enclose the sensing plate structure.

As shown in FIG. 15, topping wafer 168 is then bonded and sealed to wafer stack 150. In one exemplary embodiment, the bonding process may be accomplished by glass frit bonding, and may take place at a partial pressure between 50 and 100 mTorr. Getter sputter deposition layer 172 may serve to absorb any residual gases present within topping recess 170, to create a sealed vacuum chamber housing rotatable sensing plate 154 of accelerometer 100.

FIG. 1 illustrates the finished structure of wafer stack 150 after application of a tri-metal sputter 176 and a dicing step in which a wafer die containing a plurality of identical structures is cut to form individual accelerometers 100.

While the fabrication process for an asymmetric silicon proof mass accelerometer has been shown and described with reference to preferred embodiments, those skilled in the art will readily appreciate that various changes and/or modifications may be made to the process without departing from the scope of the invention as described in the appended claims and their equivalents.

The invention claimed is:

1. A process for fabricating a pendulous accelerometer having a sensing plate with a symmetric plate area and an asymmetric plate mass, the process comprising the steps of:
   providing a first substrate having a top planar surface, a bottom planar surface substantially parallel to the top planar surface, and a total thickness extending from the top planar surface to the bottom planar surface;
   etching a portion of the first substrate to a first predetermined depth from the top planar surface to form a plurality of first protrusions each having a top planar surface;
   providing a second substrate having an upper planar surface;
   etching a portion of the second substrate to a second predetermined depth extending from the upper planar surface to form a plurality of second protrusions each having an upper planar surface;
   bonding the top planar surface of at least one of the first protrusions to the upper planar surface of at least one of the second protrusions to form an anchor portion; and
   etching a portion of the first substrate from the bottom planar surface to a third predetermined depth at least equal to the difference between the total thickness of the first substrate and the first predetermined depth to form a freely rotatable sensing plate having a solid proof mass on a first side of the anchor portion and a substantially hollow proof mass on a second side of the anchor portion.

2. The process of claim 1, wherein the total thickness of the first substrate is approximately 75 μm.

3. The process of claim 2, wherein the first predetermined depth is approximately 20 μm.

4. The process of claim 3, wherein the third predetermined depth is approximately 55 μm.

5. The process of claim 1, further comprising the steps of:
   forming a first fixed electrode surface on the second substrate beneath the first side of the sensing plate;
   forming a second fixed electrode surface on the second substrate beneath the second side of the sensing plate; and
   forming a plurality of protrusions extending upward from each of the fixed electrode surfaces.

6. The process of claim 5, wherein the step of forming the plurality of protrusions includes performing a thermal oxidation process on selected areas of the second substrate to form a plurality of oxide bumps.

7. The process of claim 1, wherein the step of etching a portion of the first substrate from the top planar surface includes the steps of depositing a first masking material on a portion of the top planar surface of the first substrate and photo chemical etching a remaining portion of the first substrate that is not covered by the masking material.

8. The process of claim 7, wherein the step of depositing a first masking material includes depositing a nitride layer using low pressure chemical vapor deposition.

9. The process of claim 8, wherein the step of photo chemical etching of the substrate is performed using potassium hydroxide (KOH).

10. The process of claim 1, wherein the step of providing a second substrate includes providing a silicon-on-insulator substrate having two silicon layers separated by an oxide layer.

11. The process of claim 1, wherein the step of bonding the top planar surface of at least one of the first protrusions to the upper planar surface of at least one of the second protrusions comprises fusion bonding of the planar surfaces.

12. The process of claim 11, further comprising the step of forming alignment marks in an oxide layer disposed on a lower planar surface of the second substrate to aid in alignment of the first substrate with the second substrate during the fusion bonding process.

13. The process of claim 1, wherein the step of etching a portion of the second substrate includes the steps of
   depositing a first masking layer using low pressure chemical vapor deposition on a portion of the upper planar surface of the second substrate;
   reactive ion etching a portion of the second substrate not covered by the first masking layer to form the plurality of second protrusions;
   removing the first masking layer;
   depositing a second masking layer on a portion of the second substrate, including each of the plurality of second protrusions; and
   deep reactive ion etching the portion of the second substrate not covered by the second masking layer to form a fixed electrode structure extending upward from the oxide layer, wherein the fixed electrode structure has a thickness, as measured from the oxide layer, that is less than the thickness of each of the second protrusions.

14. The process of claim 13, further comprising the step of performing a thermal oxidation process on selected areas of the fixed electrode structure to form a plurality of oxide bumps on the fixed electrode structure.

15. The process of claim 1, further comprising the steps of:
   providing a topping wafer;
   etching a portion of the topping wafer to form a topping recess; and
   bonding the topping wafer to the second substrate such that the freely rotatable sensing plate is enclosed within the topping recess.

16. The process of claim 15, further comprising depositing a thin film over a portion of the surface of the topping recess by getter sputtering.

17. The process of claim 15, further comprising frit printing a contact surface of the topping wafer.

18. The process of claim 17, wherein the bonding step is accomplished using frit bonding.

19. A process for fabricating a pendulous accelerometer having an asymmetrical sensing plate, the process comprising the steps of:

depositing a first masking material on a portion of a top planar surface of a first substrate, the first substrate having a bottom planar surface substantially parallel to the top planar surface and a total thickness measured from the top planar surface to the bottom planar surface;

etching a remaining portion of the first substrate that is not covered by the masking material to a first predetermined depth measured from the top planar surface to form a plurality of first protrusions having planar surfaces;

depositing a second masking material on a portion of a first planar surface of a second substrate;

etching a remaining portion of the second substrate that is not covered by the masking material to a second predetermined depth measured from the first planar surface to form a plurality of second protrusions each having a planar surface;

bonding the planar surface of at least one of the first protrusions to the planar surface of at least one of the second protrusions to form an anchor portion;

etching the first substrate from the bottom planar surface to a third predetermined depth at least equal to the difference between the total thickness of the first substrate and the first predetermined depth to form a freely rotatable sensing plate having a solid proof mass on a first side of the anchor portion and a substantially hollow proof mass on the second side of the anchor portion.

20. The process of claim 19, wherein the step of etching the first substrate from the bottom planar surface further comprises etching a plurality of hollow cavities in the first substrate to form the substantially hollow proof mass on the second side of the anchor portion.

* * * * *